US009914260B2

(12) United States Patent
Ellice

(10) Patent No.: US 9,914,260 B2
(45) Date of Patent: Mar. 13, 2018

(54) PEX EXPANDING TOOL

(71) Applicant: Milwaukee Electric Tool Corporation, Brookfield, WI (US)

(72) Inventor: Joseph H. Ellice, Greenfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 236 days.

(21) Appl. No.: 14/713,180

(22) Filed: May 15, 2015

(65) Prior Publication Data

US 2015/0367556 A1  Dec. 24, 2015

Related U.S. Application Data

(60) Provisional application No. 62/014,863, filed on Jun. 20, 2014.

(51) Int. Cl.
| | |
|---|---|
| *B29C 55/24* | (2006.01) |
| *B29C 55/00* | (2006.01) |
| *B29C 57/04* | (2006.01) |
| *B29L 23/00* | (2006.01) |
| *B29K 23/00* | (2006.01) |

(52) U.S. Cl.
CPC ...... *B29C 57/04* (2013.01); *B29K 2023/0691* (2013.01); *B29L 2023/22* (2013.01)

(58) Field of Classification Search
CPC ..... B29C 57/045; B29C 57/04; B21D 41/026; B21D 41/02; Y10T 29/4994; Y10T 29/53722; B29K 2023/0691; B29L 2023/22; B25H 1/0021; B25H 1/0042
See application file for complete search history.

(56) References Cited

U.S. PATENT DOCUMENTS

| | | | |
|---|---|---|---|
| 1,404,819 A | 1/1922 | Wiedeke | |
| 2,085,447 A | 6/1937 | Plaine | |
| 2,086,102 A * | 7/1937 | Stradling | B23K 3/027 |
| | | | 219/242 |
| 2,737,996 A | 3/1956 | Toth | |
| 2,999,529 A | 9/1961 | Rast | |

(Continued)

FOREIGN PATENT DOCUMENTS

| | | |
|---|---|---|
| DE | 19730054 C1 | 3/1999 |
| DE | 19924695 A1 | 11/2000 |

(Continued)

*Primary Examiner* — Alison L Hindenlang
*Assistant Examiner* — Jerzi H Moreno Hernandez
(74) *Attorney, Agent, or Firm* — McDonnell Boehnen Hulbert & Berghoff LLP

(57) ABSTRACT

A tool operable to expand an end of a pipe is disclosed. The tool has a longitudinal axis and a vertical axis. The tool includes a working end disposed at a distal end along the longitudinal axis. This working end includes a plurality of jaws movable between a closed position and an expanded position and rotatable about the longitudinal axis of the tool. Further, the tool includes a main body connected to the working end. This main body includes a handle disposed at a proximal end along the vertical axis of the tool, wherein the handle is configured to be gripped in an orientation that is substantially parallel to the longitudinal axis of the tool. Further, the tool includes a trigger disposed on the handle, and the trigger is configured to be activated by trigger movement along the vertical axis of the tool.

24 Claims, 14 Drawing Sheets

(56) References Cited

U.S. PATENT DOCUMENTS

| | | | |
|---|---|---|---|
| 3,550,424 A | 12/1970 | Rast | |
| 3,888,102 A | 6/1975 | Nigido | |
| 3,940,227 A | 2/1976 | Strasser | |
| 4,034,591 A | 7/1977 | Rothenberger | |
| 4,107,249 A | 8/1978 | Murai et al. | |
| 4,144,735 A | 3/1979 | Rothenberger | |
| 4,154,083 A | 5/1979 | Rothenberger | |
| 4,314,782 A * | 2/1982 | Beekenkamp | B25H 1/005 408/110 |
| 4,425,783 A * | 1/1984 | Rast | B21D 41/026 72/393 |
| 4,735,078 A | 4/1988 | Wesebaum | |
| 4,890,472 A | 1/1990 | Rothenberger | |
| 5,046,349 A | 9/1991 | Velte | |
| 5,090,230 A | 2/1992 | Koskinen | |
| 5,160,114 A * | 11/1992 | Livingston | B23D 59/007 144/136.95 |
| 5,243,845 A | 9/1993 | Velte | |
| 5,744,085 A * | 4/1998 | Sorberg | B21D 39/20 264/296 |
| 6,068,543 A * | 5/2000 | Renn | B23D 59/007 29/26 A |
| 6,315,179 B1 * | 11/2001 | Hillis | A45F 3/14 224/200 |
| D456,681 S * | 5/2002 | Cheng | D8/29.1 |
| 6,862,766 B2 | 3/2005 | Geurts | |
| 7,065,995 B2 | 7/2006 | Fremlem | |
| 7,128,560 B2 | 10/2006 | Tandart | |
| 7,325,346 B2 | 2/2008 | Cheng | |
| 7,922,475 B2 | 4/2011 | Gueit | |
| 8,517,715 B2 | 8/2013 | Thorson et al. | |
| 2005/0217440 A1 * | 10/2005 | Koschel | B25F 5/026 81/490 |
| 2006/0201228 A1 | 9/2006 | Rothenberger | |
| 2007/0045345 A1 * | 3/2007 | Monfeli | B05C 17/00526 222/173 |
| 2007/0057393 A1 | 3/2007 | Hartmann et al. | |
| 2007/0081869 A1 * | 4/2007 | Glodowski | B25H 1/0064 408/110 |
| 2008/0160130 A1 | 7/2008 | Gueit | |
| 2011/0239425 A1 * | 10/2011 | Thorson | B21D 41/026 29/243.518 |
| 2012/0181727 A1 * | 7/2012 | Lindner | B21D 39/20 264/288.4 |
| 2012/0207884 A1 * | 8/2012 | Adams | A23G 3/0097 426/106 |
| 2013/0341831 A1 * | 12/2013 | Thorson | B21D 41/026 264/297.5 |
| 2014/0097217 A1 * | 4/2014 | Walsh | A45F 5/021 224/268 |

FOREIGN PATENT DOCUMENTS

| | | |
|---|---|---|
| DE | 19963885 C1 | 5/2001 |
| DE | 202008002266 U1 | 4/2008 |
| DE | 102008061441 A1 | 7/2009 |
| EP | 0219268 A2 | 4/1987 |
| EP | 0397570 A1 | 11/1990 |
| EP | 0462719 A2 | 12/1991 |
| EP | 0567742 A2 | 11/1993 |
| EP | 0718057 A2 | 6/1996 |
| EP | 0878287 A1 | 11/1998 |
| EP | 1118401 A1 | 7/2001 |
| EP | 1938950 A1 | 7/2008 |
| EP | 2090384 A2 | 1/2009 |
| EP | 2090385 A2 | 1/2009 |
| EP | 2226182 A2 | 9/2010 |
| EP | 2258537 A1 | 12/2010 |
| EP | 2332716 A2 | 6/2011 |
| FR | 2451235 A1 | 10/1980 |
| FR | 2645052 A1 | 10/1990 |
| FR | 2910828 A1 | 7/2008 |
| GB | 1485098 | 9/1977 |
| GB | 1524149 A1 | 9/1978 |
| WO | 8800503 | 1/1988 |
| WO | 0189736 A1 | 11/2001 |
| WO | 2009000966 A1 | 12/2008 |

* cited by examiner

PEX EXPANDING TOOL

CROSS REFERENCE TO RELATED APPLICATIONS

The present application claims the benefit of U.S. Provisional Patent Application No. 62/014,863, filed Jun. 20, 2014 the entire contents of which are incorporated entirely herein by reference.

BACKGROUND

Unless otherwise indicated herein, the materials described in this section are not prior art to the claims and are not admitted to be prior art by inclusion in this section.

The present disclosure relates to pipe and tubing expansion tools and methods. More particularly, the present disclosure relates to PEX (cross-linked polyethylene) expansion tools that utilize a multi-segment expansion head, and an auto-rotation feature.

Polymer tubing is gaining popularity in residential home and commercial building construction due to the rising cost of copper pipe. One of the more common types of polymer tubing is made from cross-linked polyethylene, commonly known as PEX. Polymer tubing is connected to a joint by expanding the mouth of the tubing, thus allowing the tubing to slip over the joint. The tubing is then secured to the joint by crimping the expanded part of the tubing. A typical building will have many joints; hence installation of the tubing involves expanding the mouths of numerous tubes.

Further, repair work or installation work on tubes such as PEX pipes typically require a technician to use an expanding tool in a plurality of different locations and orientations. For instance, a tube may be positioned above or below a user, and the end of the tube to be expanded may be positioned at numerous angles with respect to the user (and thereby with respect to the expanding tool). For example, pipes or tubes that a technician is repairing or installing may be located at or near the floor, at or near the ceiling, and/or on a sidewall. Other examples are possible as well. Further, the pipes or tubes may be arranged in numerous different orientations. For example, the end of the pipe may be facing vertically downwards, vertically upwards, longitudinally to the left, longitudinally to the right, or at many other angles. Yet still further, when installing or repairing pipes or tubes, a technician often needs to work in tight or compact spaces (e.g., so as to access a pipe located in a tight or compact space).

Existing tools for expanding the end of a pipe or tube have a number of drawbacks. For example, existing tools are often limited in the number of orientations at which the user may use the expanding tool. In particular, existing tools are often limited in the number of orientations at which the user may comfortably and/or successfully operate the tool. Another example drawback of existing expanding tools is that the existing tools are often too large (e.g., bulky) to be used in compact spaces in which a technician may be operating the tool.

Overview

A tool operable to expand an end of a pipe or tube is disclosed. The tool has a longitudinal axis and a vertical axis. In an example embodiment, the tool includes a working end disposed at a distal end along the longitudinal axis. The working end includes a plurality of jaws movable between a closed position and an expanded position and rotatable about the longitudinal axis of the tool. The tool further includes a main body connected to the working end. The main body includes a handle disposed at a proximal end along the vertical axis of the tool, and the handle is configured to be gripped in an orientation that is substantially parallel to the longitudinal axis of the tool. Further, the tool includes a trigger disposed on the handle, where the trigger is configured to be activated by trigger movement along the vertical axis of the tool.

In another example, the tool includes a working end disposed at a distal end along the longitudinal axis. The working end includes a plurality of jaws movable between a closed position and an expanded position and rotatable about the longitudinal axis of the tool. Further, the tool includes a main body connected to the working end. The main body includes (i) a handle disposed at a proximal end along the vertical axis of the tool and (ii) a kickstand portion disposed at a distal end along the vertical axis of the tool. Still further, the tool includes a trigger disposed on the handle. The handle is configured to be gripped in an orientation that is substantially parallel to the longitudinal axis of the tool, and the trigger is configured to be activated by trigger movement along the vertical axis of the tool. Yet still further, the kickstand portion includes a kickstand configured to be rotated approximately 180 degrees from (i) a first position that is substantially parallel to the longitudinal axis to (ii) a second position that is substantially parallel to the longitudinal axis.

In another example, the tool includes a working end disposed at a distal end along the longitudinal axis, and the working end is configured to expand the end of a pipe or tube. Still further, the tool includes a main body connected to the working end, and the main body includes a handle disposed at a proximal end along the vertical axis of the tool. The handle is configured to be gripped in an orientation that is substantially parallel to the longitudinal axis of the tool. Still further, the tool includes a trigger disposed on the handle, and the trigger is configured to be activated by trigger movement along the vertical axis of the tool.

The features, functions, and advantages can be achieved independently in various embodiments of the present disclosure or may be combined in yet other embodiments in which further details can be seen with reference to the following description and drawings.

DETAILED DESCRIPTION

Figure 1:
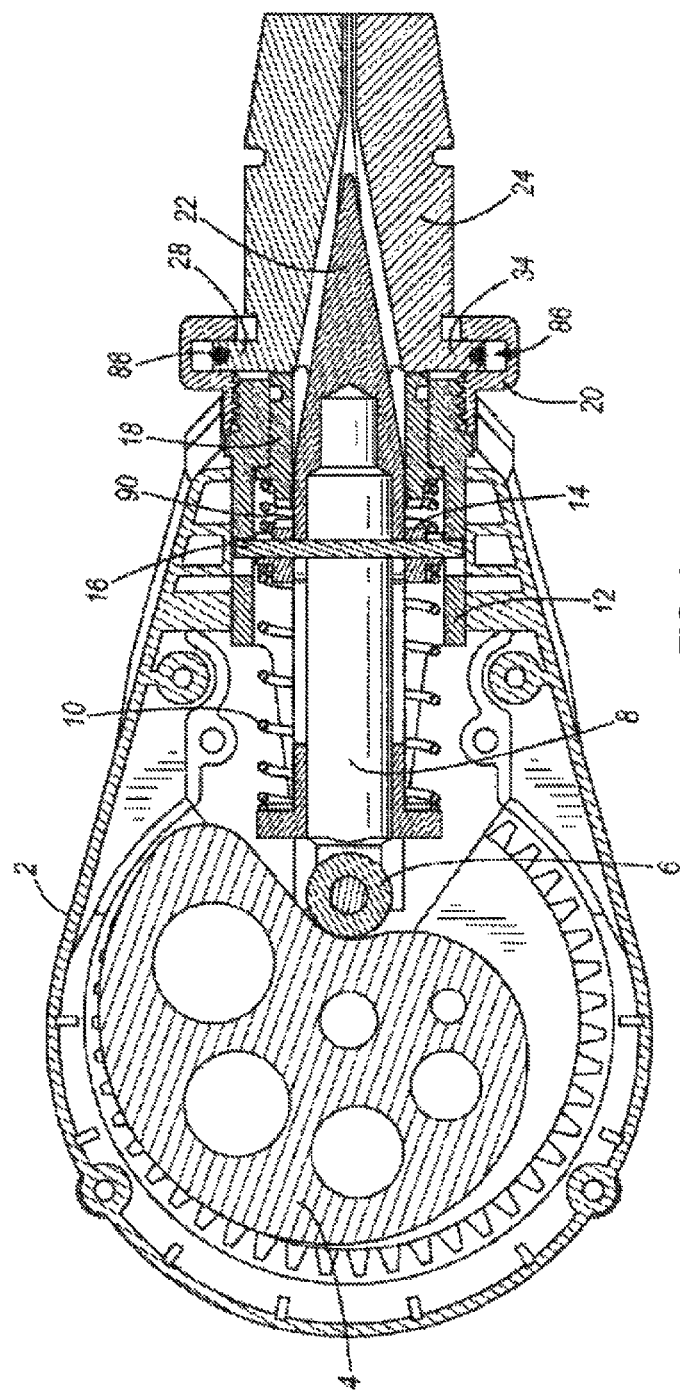
FIG. 1 is a cutaway top view an expanding tool.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. OVERVIEW OF EXAMPLE EXPANDING TOOL

As mentioned above, existing tools for expanding the end of a pipe have a number of drawbacks. For example, existing tools are often limited in the number of orientations at which the user may operate the expanding tool. Another example drawback of existing expanding tools is that the existing tools are often too large or bulky to be used in compact spaces in which a technician may be operating the tool. Thus, it would be desirable to provide an improved expanding tool that allows the user to operate the tool in both a wide variety of different orientations and in compact spaces.

The tool in accordance with the present disclosure beneficially provides such an improved expanding tool. An example tool in accordance with the present disclosure includes a unique arrangement of the tool handle with respect to the working end. This disclosed arrangement beneficially allows a user to use the tool in a plurality of different orientations. Further, this disclosed arrangement of the handle with respect to the working end also allows the tool to have a compact size. As a result, the tool can be used in different orientations and in compact or tight spaces more easily than existing expanding tools on the market.

An example tool in accordance with the present disclosure has a longitudinal axis and a vertical axis, and the tool includes a working end disposed at a distal end along the longitudinal axis. The working end includes a plurality of jaws movable between a closed position and an expanded position and rotatable about the longitudinal axis of the tool. The tool further includes a main body connected to the working end. The main body includes a handle disposed at a proximal end along the vertical axis of the tool, and the handle is configured to be gripped in an orientation that is substantially parallel to the longitudinal axis of the tool. Further, the tool includes a trigger disposed on the handle, where the trigger is configured to be activated by trigger movement along the vertical axis of the tool.

2. EXAMPLE EMBODIMENTS OF EXPANDING TOOL

In an example embodiment the disclosure provides a tool operable to expand an end of a pipe. The tool includes a plurality of jaws movable between a closed position and an expanded position and rotatable about a longitudinal axis and a rotation collar rotationally coupled to each of the plurality of jaws. A shuttle is selectively engageable with the rotation collar and is rotatable between a first orientation and a second orientation and a spindle is movable between a first position in which the shuttle is in the first orientation and is disengaged from the rotation collar, a second position in which the shuttle is in the first orientation and is engaged with the rotation collar, and a third position in which the shuttle and the rotation collar are rotated together to the second orientation. The rotation of the rotation collar produces a corresponding rotation of the plurality of jaws while the plurality of jaws is in the closed position. Movement of the spindle to a fourth position moves the plurality of jaws to the expanded position and maintains the engagement of the shuttle and the rotation collar in the second orientation.

Referring now to the drawings, an expanding tool 3 includes a housing 2, and disposed inside the housing 2 a cam 4 which is rotatably attached to the housing 2. A buffer 6 is disposed inside the housing 2 and is in contact with the cam 4, such that as the cam 4 rotates the buffer 6 moves inside the housing 2. A spindle 8 is disposed inside the housing 2 and is in contact with the buffer 6, such that the spindle 8 moves in conjunction with the buffer 6. A spring 10 is disposed on the exterior of the spindle 8 and is in contact with the spindle 8. The spindle 8 is partially disposed within a sleeve 12 that has a first end and a second end. The sleeve 12 is partially disposed within and connected to the housing 2. The spindle 8 includes a portion disposed in the interior of a shuttle 14, and a pin 16 connects the sleeve 12, the shuttle 14, and the spindle 8. In one embodiment, a rotation collar 18, having a first end and a second end, is disposed on the exterior of the spindle 8, and the rotation collar 18 is able to engage the shuttle 14. A cap 20 is disposed on the second end of the sleeve 12. A wedge 22 is connected to the spindle 8. A plurality of jaws 24 are connected to the cap 20 and engage with the rotation collar 18 and the wedge 22.

Figure 2:
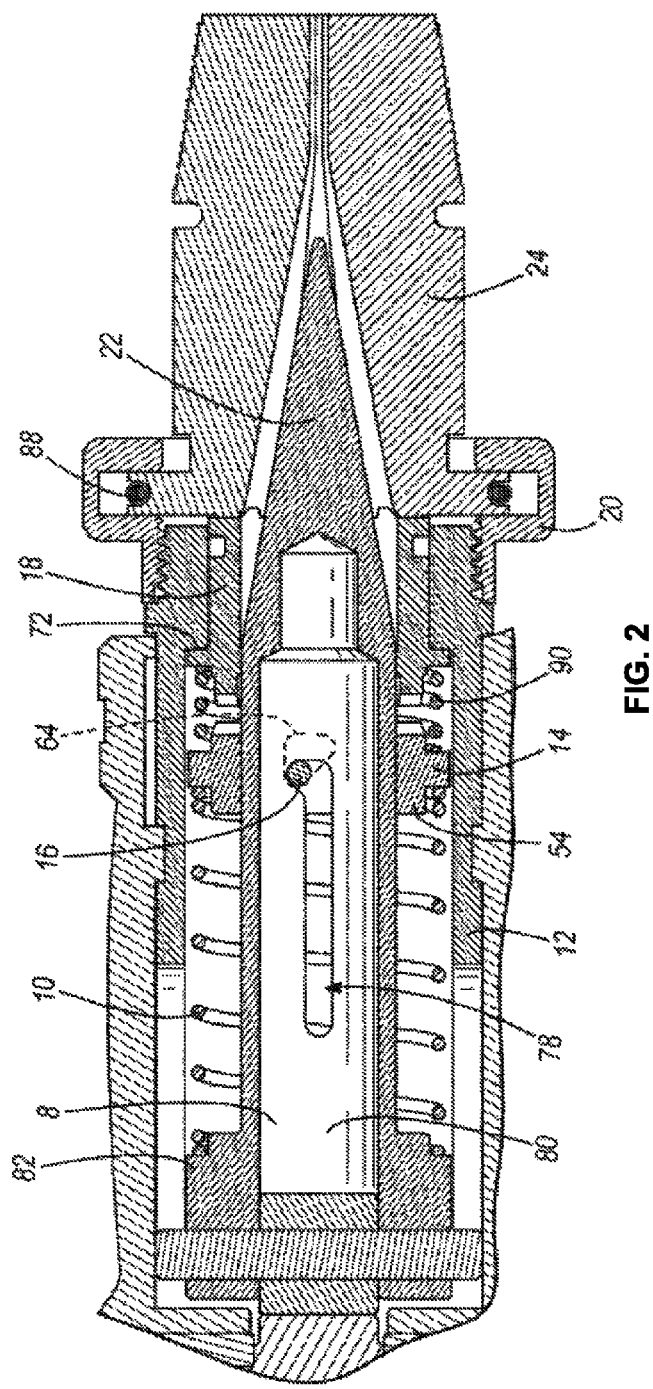
FIG. 2 is a top view of the spindle portion and jaws of the tool of FIG. 1, showing the tool in a home position.

FIGS. 1 and 2 show the expanding tool in a home position, that is, the position the tool remains in when it is not being operated. In one embodiment, the cam 4 is connected to an electric motor (not shown) that is selectively operable by a user. In another embodiment the operator rotates the cam 4 via a lever (not shown) and gears (not shown). The cam 4 is connected to the housing 2 such that the cam 4 is able to rotate about an axis.

Figure 5:
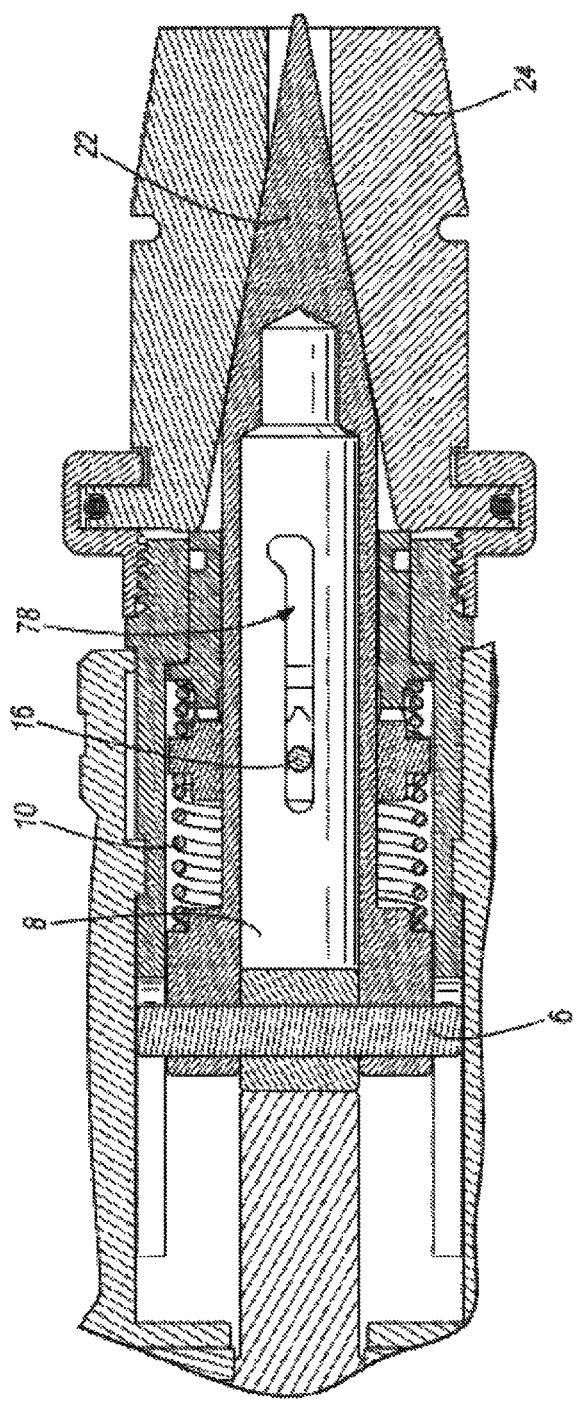
FIG. 5 is a top view of the spindle portion and jaws of the tool of FIG. 1, showing the spindle portion in a fourth position with the jaws in a partially expanded state.
Figure 6:
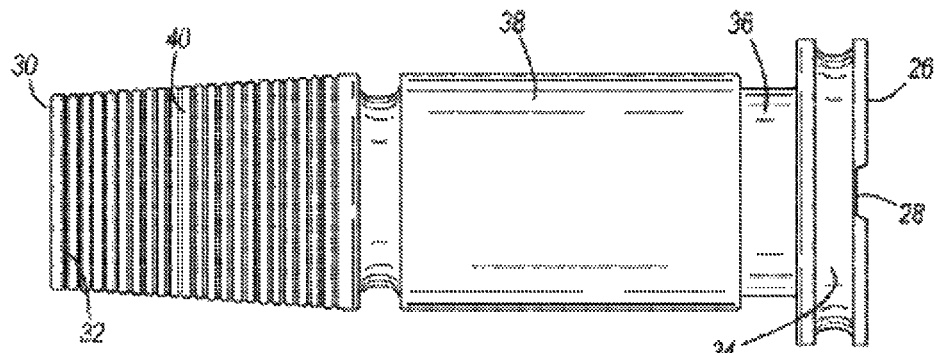
FIG. 6 is a top view of a plurality of jaws.

As illustrated in FIG. 6, a first end of one of the jaws 24 includes an interface portion 26 including a slot 28 adapted to engage the rotation collar 18 as will be discussed with regard to FIGS. 2-5. A second end of the jaw includes a frustoconical end 30 that extends from a small diameter cylindrical portion 32. A collar portion 34 is disposed adjacent the first end of the jaw 24. The collar 34 includes a large diameter portion 36. In the illustrated construction, a plurality of ribs 40 is formed in the frustoconical end 30. However, other constructions may omit the ribs 40. In the illustrated construction, two or more jaws 24 are used to define a complete 360 degree jaw section that fits within a tube to be expanded. Of course, other constructions could employ three or more jaws 24 to complete the jaw section of the tool.

Figure 7:
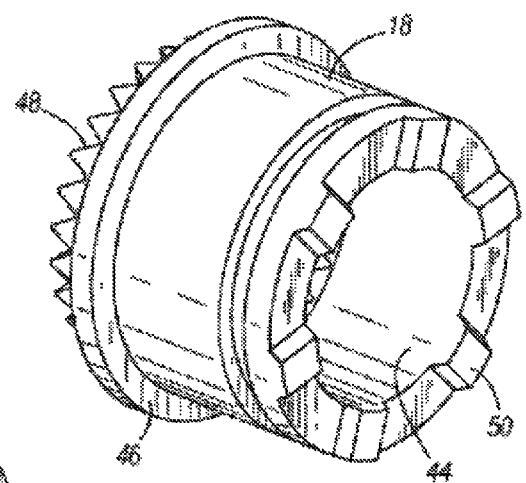
FIG. 7 is a perspective view of a rotation collar.

The rotation collar 18, illustrated in FIG. 7 includes a substantially hollow cylindrical body 44 that includes a first end having a radially extending boss 46 and a series of teeth 48 extending axially. In another embodiment the teeth 48 are shaped to allow the shuttle 14 to slip with respect to the rotation collar 18 when a certain opposing force is present on the rotation collar 18. A second end of the rotation collar 18 has a series of extensions 50 sized and shaped to engage the slots 28 of the interface portion 26 of the jaws 24. The extensions 50 extend axially in a direction opposite the teeth 48 on the first end. The extensions 50 extend in an axial direction and are configured such that each extension 50 engages one of the jaws 24 such that the rotation collar 18 and the jaws 24 are coupled for rotation about a central axis but are free to move separately along that axis if required. The shape and number of the extensions 50 is a function of the number of jaws 24 and the shape or arrangement of the interface portion 26 of the jaws 24. Thus, other configurations of the extensions as well as the interface portion 26 are possible and are contemplated.

Figure 8:
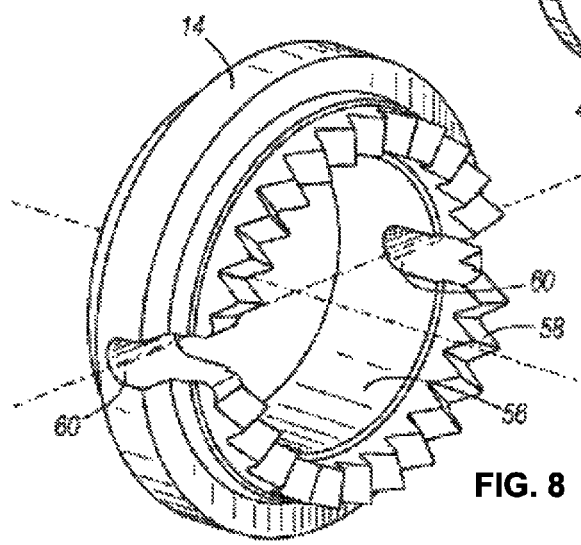
FIG. 8 is a perspective view of a spindle collar.

The shuttle 14, shown in FIG. 8 includes a shoulder 54 (shown in FIG. 2) positioned at the inner most diameter on a first end. The shuttle includes a hollow cylindrical body 56 having a series of teeth 58 extending in a second axial direction. In another embodiment the teeth 58 are shaped to allow the shuttle 14 to slip with respect to the rotation collar 18 when a certain opposing force is present on the rotation collar 18. The teeth 58 are arranged to substantially match and engage the teeth 48 of the rotation collar 18 to couple the rotation collar 18 and the shuttle 14 for rotation as will be discussed with regard to FIGS. 2-5. A pair of apertures 60 are formed along a diameter of the shuttle 14 such that the central axis of the apertures intersects and is normal to the axis of the tool. As will be discussed in greater detail with regard to FIGS. 2-5 the shoulder 54 operates to guide a spring 10 and maintain the spring 10 in a desired operating position.

Figure 9:
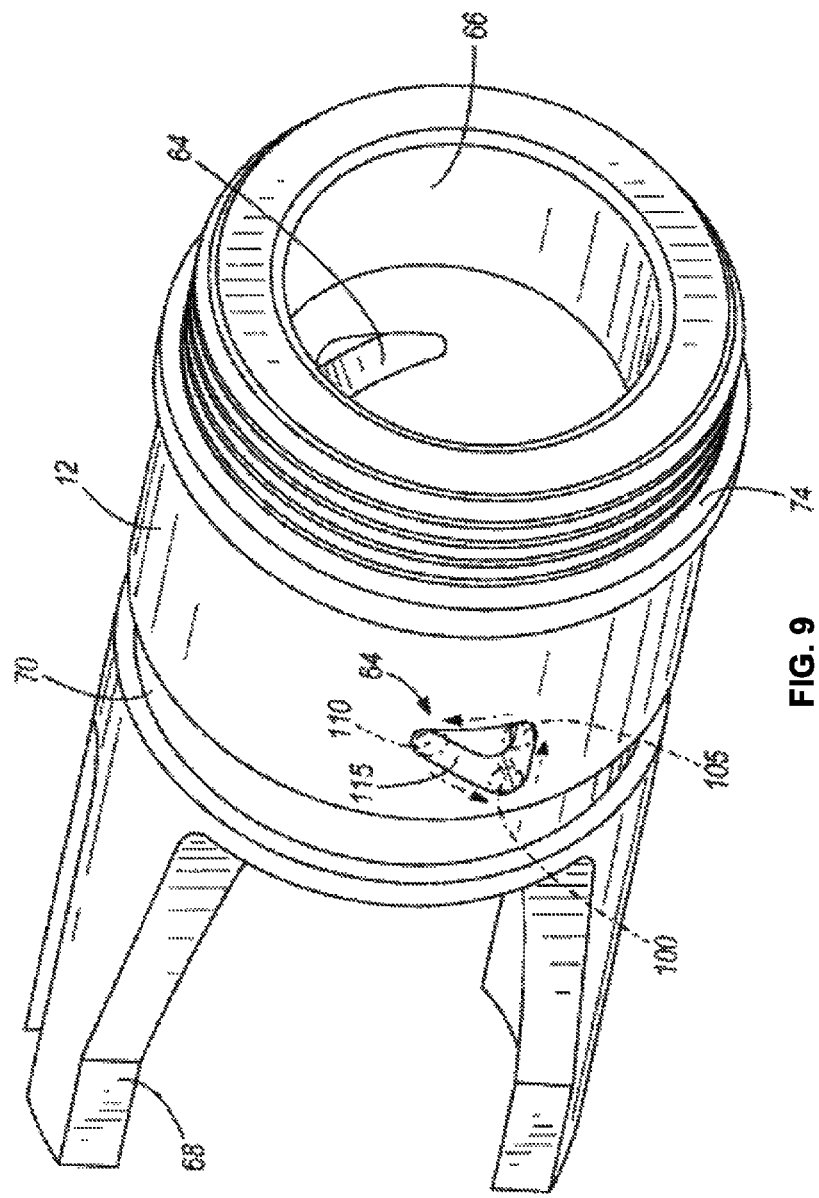
FIG. 9 is a perspective view of a sleeve.
Figure 10:
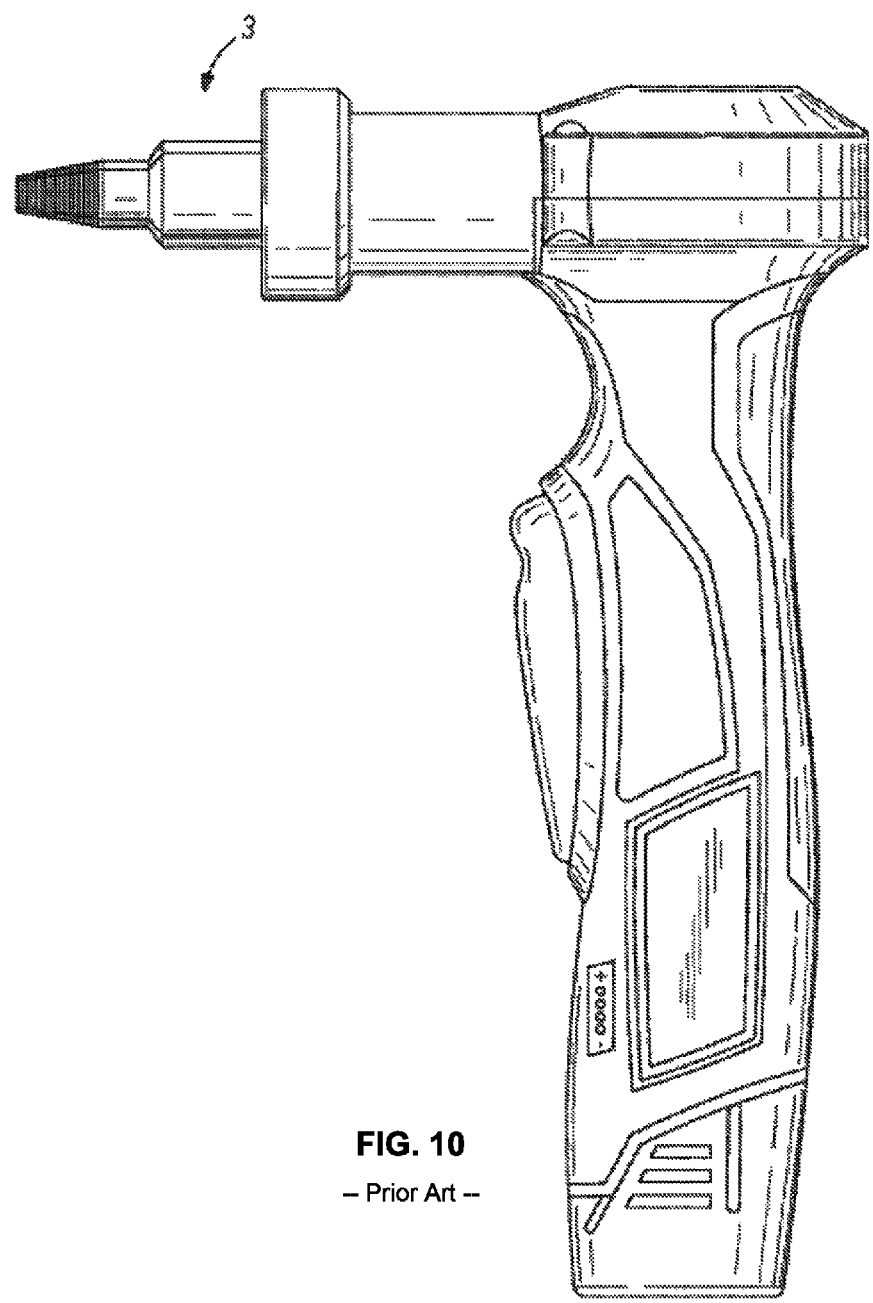
FIG. 10 is a perspective view of a hand tool including the expanding tool of FIG. 1.

The sleeve 12, shown in FIG. 9 includes a pair of triangular shaped recesses 64. The sleeve 12 includes a hollow cylindrical body 66 sized to substantially match and engage the interior of the housing 2. A first end of the sleeve 12 includes a plurality of projections 68 having space therebetween and a shoulder 70 positioned on the exterior of the sleeve 12. A second end of the sleeve includes a shoulder 72 disposed on the interior of the sleeve (as seen in FIG. 2). Threads 74 are disposed on the exterior of the second end of the sleeve.

As can be seen in FIG. 2, the spindle 8 is substantially cylindrical and is hollow. A pair of L-shaped apertures 78 are formed by the cylindrical wall 80 of the spindle 8. A long portion of the L-shaped aperture 78 extends along an axis that is substantially parallel to the center axis of the spindle 8. A flange 82 is disposed on a first end of the spindle 8. The flange 82 receives and guides the spring 10 to maintain the spring 10 in a desired operating position.

The wedge 22 attaches to the spindle 8 and is disposed within a space defined by the jaws 24. The second end of the wedge 22 has a shape which is designed to substantially match and engage the interior of the jaws 24.

The spring 10 provides a force which keeps the spindle in contact with the buffer 6, and the buffer 6 in contact with the cam 4. In the home position the shuttle 14 and rotation collar 18 are separated.

With reference to FIG. 1, the jaws 24 are arranged to extend 360 degrees around when in the home position. Thus, the collar portion 34 cooperates to define a complete disk-shaped collar that fits within a recess 86 formed as part of the cap 20. The recess 86 restrains axial movement of the jaws 24 while allowing substantially free radial movement of the jaws 24. A biasing member 88, such as a spring, is positioned within the recess 86 and biases the jaws 24 in a closed position when the jaws 24 are not being expanded by the wedge 22.

The sleeve 12 is substantially disposed in the interior of the housing 2. The second end of the sleeve 12 is partially disposed outside of the housing 2 and the cap 20 attaches to the second end of the sleeve 12. The rotation collar 18 is positioned adjacent the second end of the jaws 24 such that the extensions 50 can engage the slots 28 of the interface portion 26 of the jaws 24. The extensions 50 positively engage the slots 28 of the interface portion 26 of the jaws 24. Thus the extensions 50 and the slots 28 of the interface portion 26 of the jaws 24 can be coupled together to ensure that the jaws 24 rotate when the rotation collar 18 rotates. The rotation collar 18 is supported for free rotation about the axis of the tool and is free to move axially if required until the boss 46 of the rotation collar 18 contacts the shoulder 72 of the sleeve 12.

A spring 90 may be disposed between the rotation collar 18 and the shuttle 14 in order to bias the rotation collar 18 and the shuttle 14 apart. The spring 90, if employed provides less resistance to an axial force than the spring 10, such that when the spring 10 is being compressed by the spindle 8 the spring 90 compresses before the spring 10 compresses. The spindle 8 is partially disposed on the interior of the rotation collar 18 and shuttle 14 and is free to move axially. The pin 16 is disposed in the L-shaped aperture 78 of the spindle 8, the holes of the shuttle 60, and the triangular recesses 64 of the sleeve 12 thus connecting the spindle 8, shuttle 14 and sleeve 12.

Figure 3:
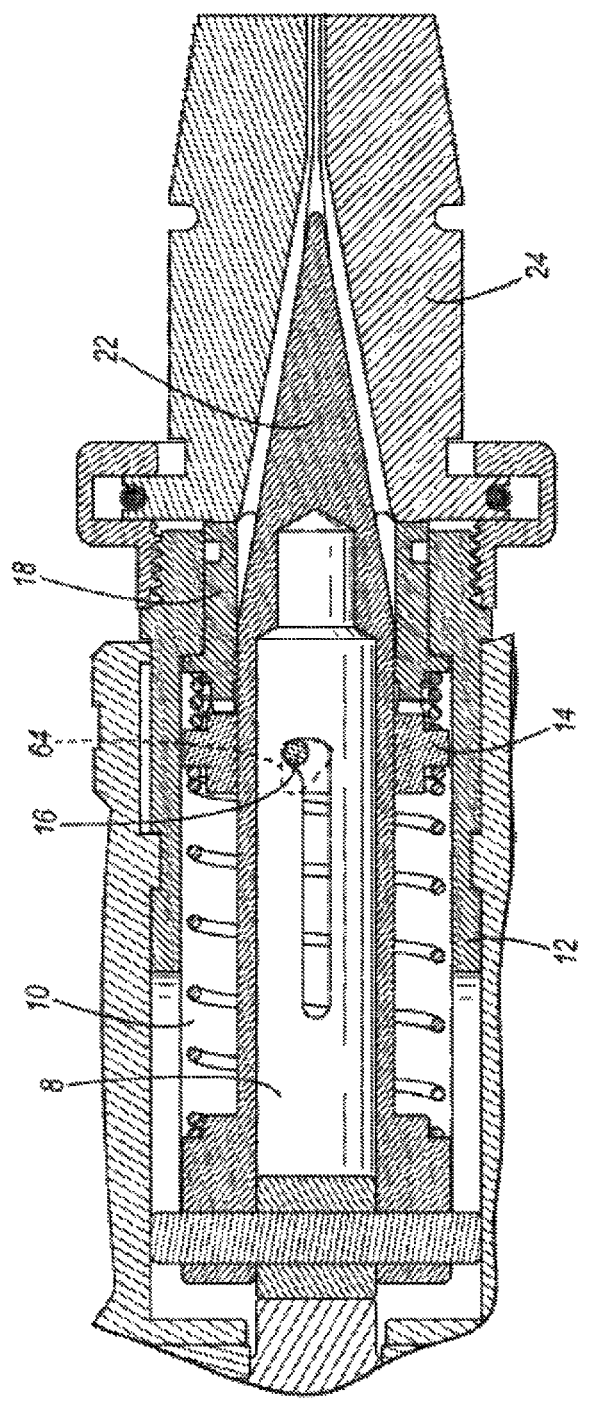
FIG. 3 is a top view of the spindle portion and jaws of the tool of FIG. 1, showing the spindle portion in a second position.

FIG. 3 shows the spindle 8 during one point of its movement towards the jaws 24. The cam 4 (not shown) is partially rotated, thus pushing the buffer 6 and the spindle 8 towards the jaws 24. The spring 10 is in contact with a base of the spindle 8 and the shuttle 14. As the spindle 8 moves towards the jaws 22, the spring 10 is moved towards the jaws, thus causing the shuttle 14 to engage with the rotation collar 18. The pin 16 is able to move with the spindle 8 for a set distance, due to the triangular recesses 64 of the sleeve 12. At this point of the cam's 4 movement, the jaws 24 have not begun to expand.

Figure 4:
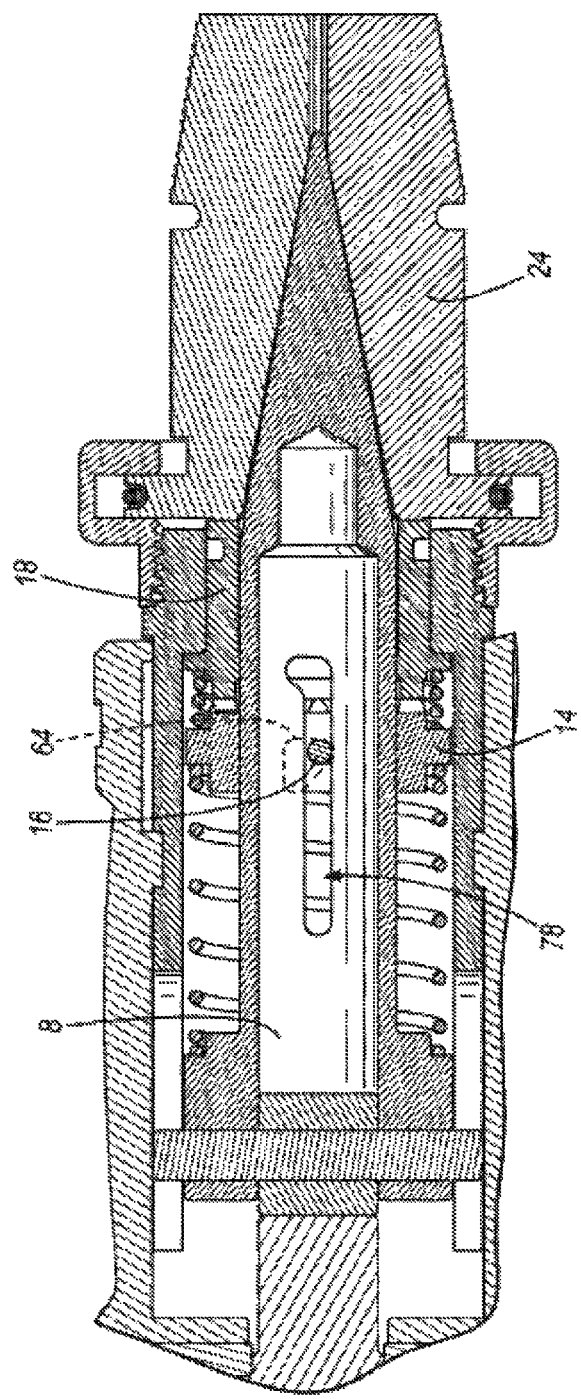
FIG. 4 is a top view of the spindle portion and jaws of the tool of FIG. 1, showing the spindle portion in a third position.

FIG. 4 shows the spindle 8 during a further point of its movements towards the jaws 24. When the shuttle 14 is engaged with the rotation collar 18, the shuttle 14 is unable to move towards the jaws 24. At this point, the force on the spindle causes the pin 16 to move within the triangular shaped recesses 64. The triangular shaped recesses 64 are positioned such that as the spindle 8 applies a force towards the jaws 24 on the pin 16, the pin 16 moves along a side of the triangular recesses 64 that is at an angle to the center axis of the spindle 8. The movement of the pin 16 in the triangular shaped recesses 64 allows continued axial movement of the spindle 8. The shape of the triangular shaped recesses 64 thus forces the pin 16 to rotate in the short end of the L-shaped aperture 78. The shuttle 14 being connected to the pin 16, and the rotation collar 18 being engaged with the shuttle 14, rotate with the pin 16. As the rotation collar 18 rotates the jaws 24 rotate as well. At this point the jaws 24 have not begun to expand.

FIG. 5 shows the jaws 24 in a partially expanded state. At this point the spindle 8 has been moved further towards the jaws 24, further compressing the spring 10. As the spindle 8 moves closer to the jaws 24, the L-shaped aperture 78 moves in relation to the pin 16 such that the pin 16 moves along the long portion of the L-shaped aperture 78, the buffer 6 thus being closer to the pin 16. As the spindle 8 moves towards the jaws 24, the wedge 22 moves towards the jaws 24. The wedge 22 then pushes the jaws 24 radially outward, expanding the jaws 24. The spindle 8 and wedge 22 will continue to move as the cam 4 rotates. When the cam 4 reaches a point in its rotation, the buffer 6, spindle 8, and wedge 22 no longer move towards the jaws 24.

When the cam 4 has reached the fully expanded position of the jaws 24, the cam 4 continues to rotate and the buffer 6, spindle 8, and wedge 22 move away from the jaws 24 due to the force of the spring 10 on the base of the spindle 8. If used, the spring 90 disposed between the rotation collar 18 and the shuttle 14, forces the rotation collar 18 and the shuttle 14 to separate. The pin 16 engages the recess in the sleeve 12 thus forcing the pin 16 and the shuttle 14 to rotate back to the home position. As the shuttle 14 is no longer engaged with the rotation collar 18, the rotation collar 18 and the jaws 24 do not rotate back to their original position. The biasing member 88 forces the jaws 24 to move radially inward to return to the home position.

In operation, the spindle 8 begins in a first position illustrated in FIG. 2. In this position, the shuttle 14 is not engaged with the rotation collar 18 and the pin 16 is in a home position 100 in the triangular opening 64 of the sleeve 12 as illustrated in FIG. 9. The pin 16 is also in the short portion of the L-shaped opening 78 as illustrated in FIG. 2. As the spindle 8 moves to the right (in FIG. 2), the spindle 8 reaches a second position illustrated in FIG. 3. During this movement, the pin 16 remains in the small portion of the L-shaped opening 78 such that the pin 16 and the shuttle 14 move with the spindle 8 until the shuttle 14 engages the rotation collar 18. As the pin 16 moves, it moves from the home position 100 in the triangular opening 64 to an engaged position 105 within the triangular opening 64 (see FIG. 3 and FIG. 9). At this point, the wedge 22 has not yet engaged the jaws 24. Further movement of the spindle 8 forces the pin 16 to move from the small portion of the L-shaped opening 78 to the large portion of the L-shaped opening 78 as the shuttle 14 and spindle 8 cannot move further toward the rotation collar 18 once the shuttle 14 and rotation collar 18 are engaged. Movement of the pin 16 in the L-shaped opening 78 forces the pin 16 to move to a rotated position 110 within the triangular opening 64 of the sleeve 12. This movement of the pin 16 causes a rotation of the shuttle 14, the rotational collar 18, and the jaws 24 prior to the wedge 22 forcing the jaws 24 outward. Additional movement of the spindle 8 toward the rotation collar 18 produces expansion of the jaws 24 with no additional rotation.

Once the expansion stroke is complete, the spindle begins to retract. As the spindle 8 retracts, the large portion of the L-shaped opening 78 moves along the pin 16 until the pin 16 reaches the end of the L-shaped opening 78. At this point, the shuttle 14 is pulled out of engagement with the rotation collar 18. The pin 16 then moves along the angled surface 115 of the triangular opening 64 to return the pin 16 to the home position 100 and to return the shuttle 14 to the non-rotated position.

The expanding tool 3 is configured so that it rotates a set amount each time, the set amount being the amount of rotation needed to move the jaws 24 from a tube mouth portion that is stretched to a tube mouth portion that is unstretched. More specifically, the rotation of the jaws 24 is at least partially determined by the number of jaws 24 and is selected to allow for multiple rotations without repeating the position of the jaws 24. For example, in one construction six jaws 24 are employed with each jaw 24 covering an arc length of 60 degrees. The tool is configured to rotate the jaws 24 25 degrees with each rotation such that twelve rotations are required before a jaw position is repeated.

FIGS. 13, 14a-b, and 15a-b depict an example expanding tool in accordance with the present disclosure. In particular, FIGS. 13-15b depict a tool 200 that is operable to expand an end of a pipe such as pipe 202 (see FIG. 15b) and that has an advantageous arrangement of the tool handle with respect to the working end of the tool.

Figure 13:
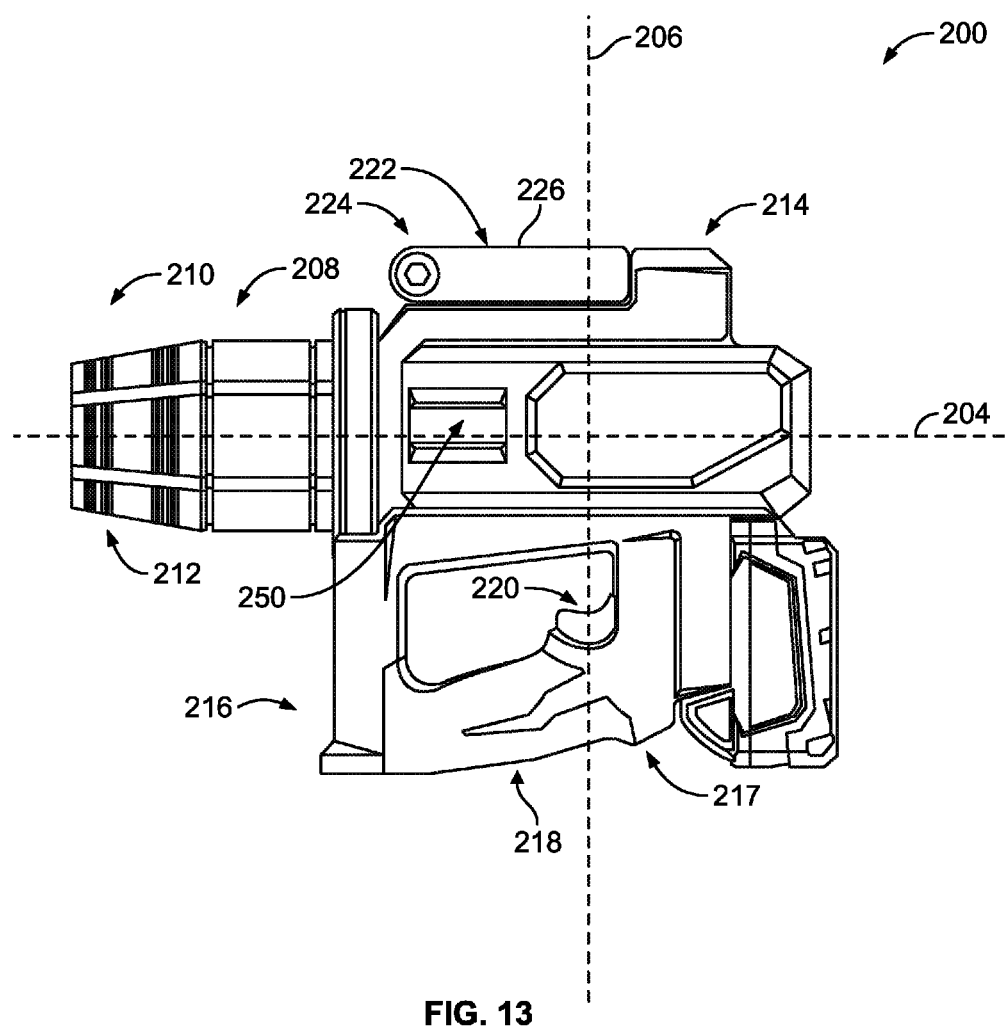
FIG. 13 is a perspective view of an example hand tool in accordance with an exemplary embodiment.

As shown in FIG. 13, tool 200 has a longitudinal axis 204 and a vertical axis 206. Tool 200 includes a working end 208 disposed at a distal end 210 along the longitudinal axis 204. This working end 208 includes a plurality of jaws 212 movable between a closed position and an expanded position and rotatable about the longitudinal axis 204 of the tool 200. The jaws 212 may operate in the same or similar fashion as the jaws described above with respect to FIGS. 1-12. In general, the jaws 212 may be operable to expand an end of a pipe into which the jaws are inserted. Further, in an example embodiment, the tool 200 may be a very large diameter (VLD) expander. Still further, in an example embodiment, the tool 200 may be a hydraulic expanding tool. In particular, the expanding tool 200 may use hydraulics in order to facilitate operation of the tool and expansion of the end of pipes. As mentioned above, tool 200 may be used for expanding an end of PEX pipe. However, tool 200 may also be useful for other applications as well.

In practice, expanding tools may require a large amount of energy to create an amount of inverse torque that will successfully expand a pipe such as a PEX pipe. Different sized pipes and pipes of different materials may require expanding tools that create different amounts of inverse torque. In an example, tool 200 is a six (6) ton compression tool with a one (1) inch jaw opening. Other examples are possible as well. For instance, tool 200 may accommodate a number of tons higher or lower that six (6), and the jaw opening may also be greater than or less than one (1) inch.

Figure 11:
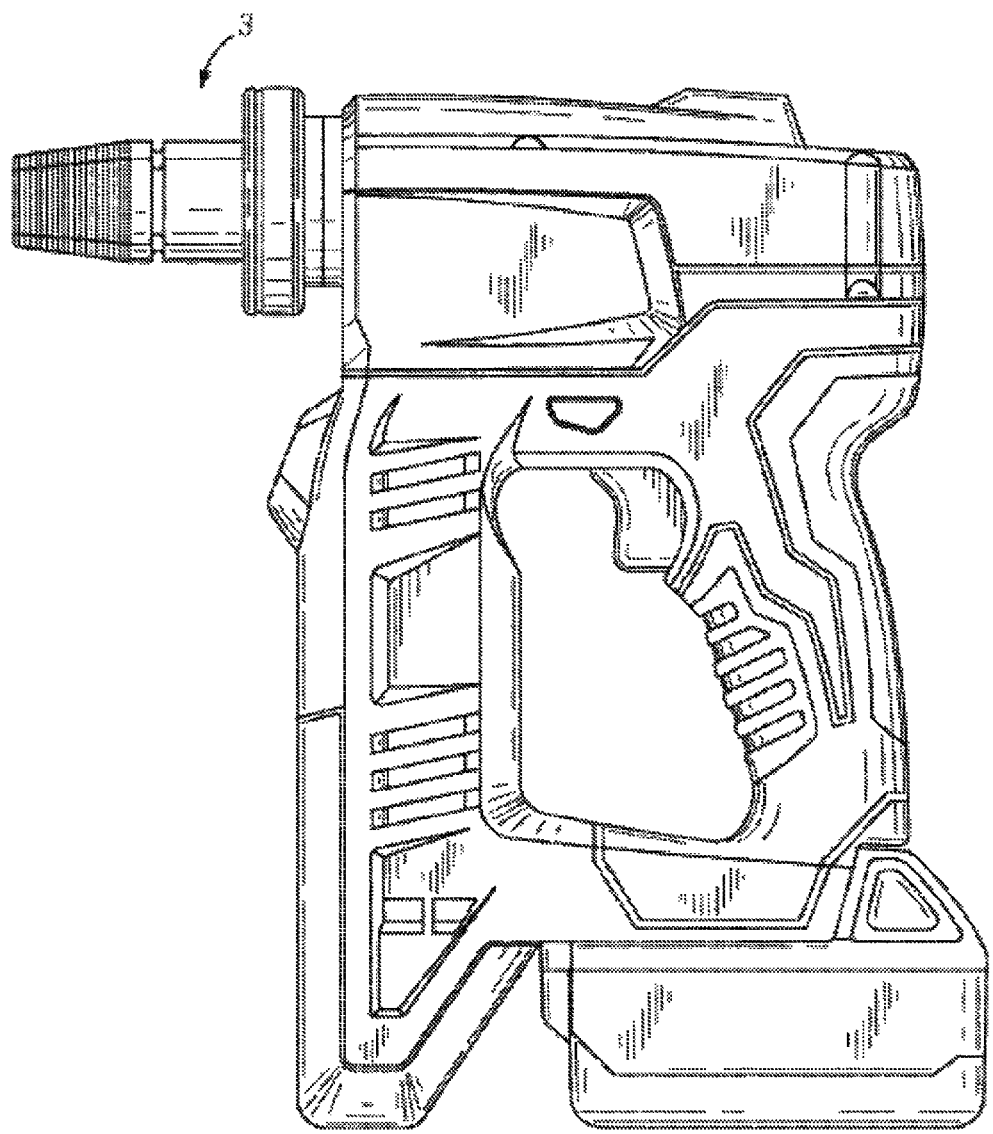
FIG. 11 is a side view of another hand tool including the expanding tool of FIG. 1.
Figure 12:
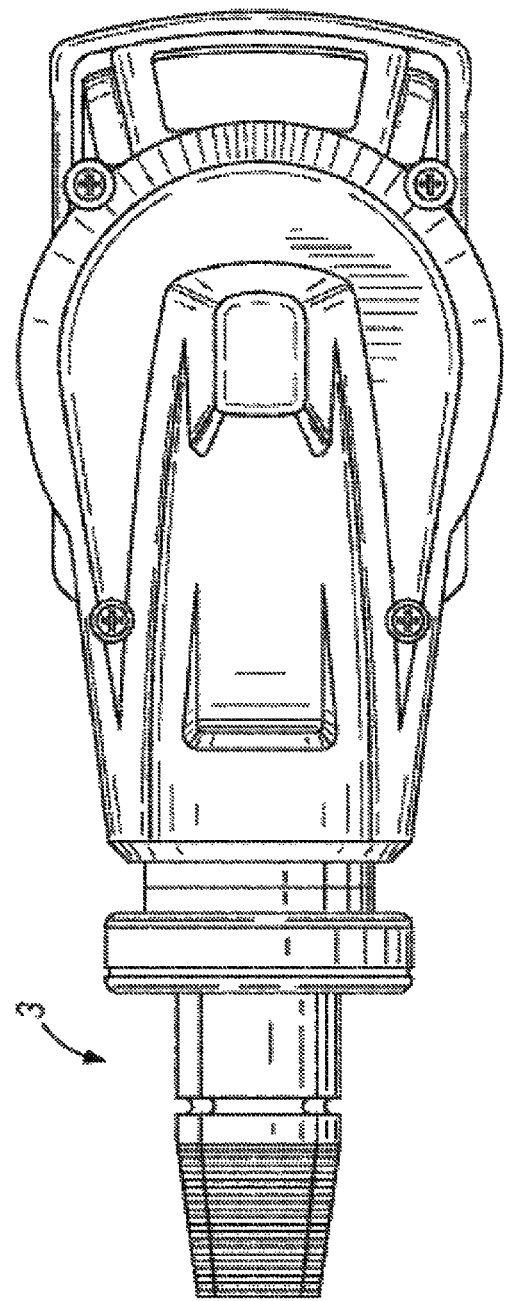
FIG. 12 is a top view of the hand tool and the expanding tool of FIG. 11.
Figure 14B:
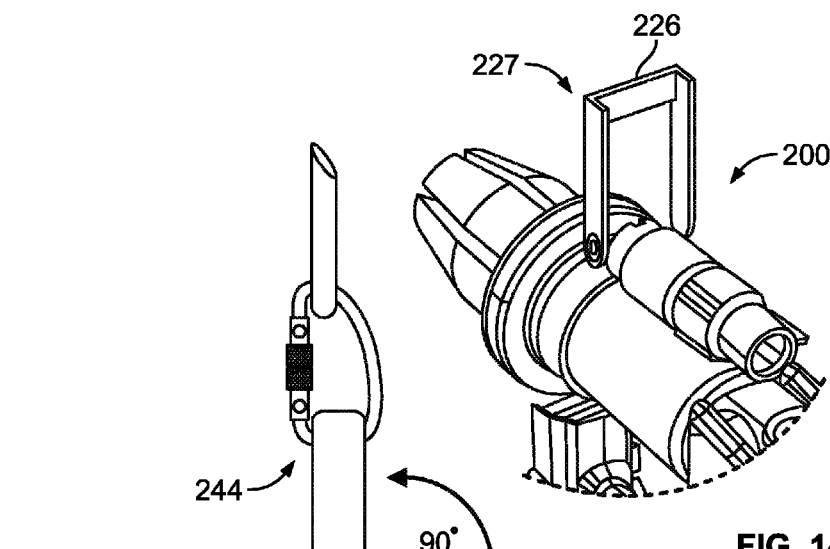
FIG. 14*b* is yet another perspective view of the hand tool of FIG. 13.
Figure 14A:
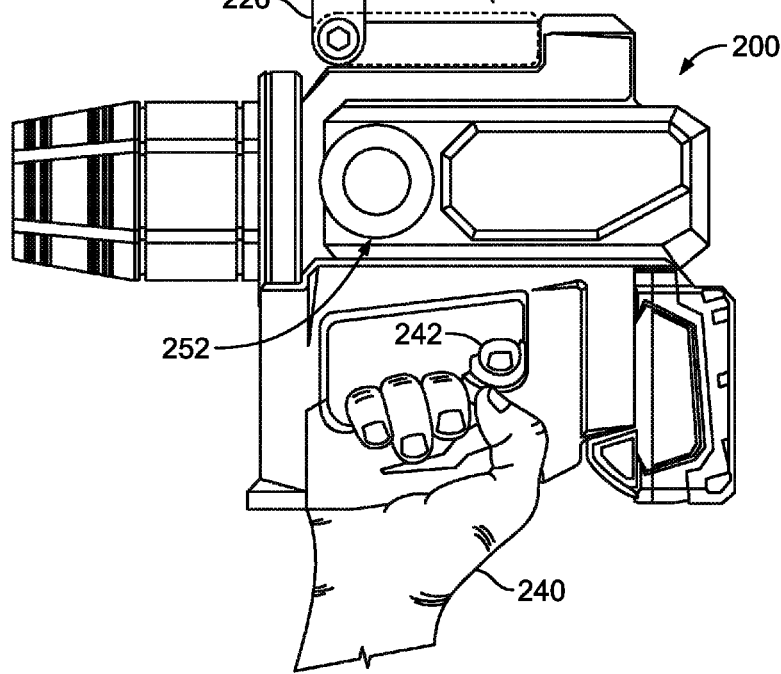
FIG. 14*a* is another perspective view of the hand tool of FIG. 13.

Returning to FIGS. 13-15b, tool 200 further includes a main body 214 connected to the working end 208. The main body 214 may house tool components, such as internal tool components for facilitating operation of the jaws and hydraulic components. Further, the main body 214 includes a handle 216 disposed at a proximal end 218 along the vertical axis 206 of the tool. As depicted in FIGS. 13-15b, the handle 216 is configured to be gripped in an orientation that is substantially parallel to the longitudinal axis of the tool. In particular, FIG. 14a depicts a user's hand 240 gripping the handle 216 in an orientation that is substantially parallel to the longitudinal axis 204 of the tool 200. In contrast, the handle of tool 3 shown in FIG. 10 and the handle of tool 3 shown in FIG. 11 are configured to be gripped in an orientation that is substantially perpendicular to the longitudinal axis of the tool 3.

In an example embodiment, an orientation that is substantially parallel to the longitudinal axis 204 may have an orientation axis that varies slightly from the longitudinal axis 204 of the tool 200. For example, an orientation that is substantially parallel to the longitudinal axis 204 may vary 10 degrees or less from the longitudinal axis 204. In another example, an orientation that is substantially parallel to the longitudinal axis 204 may vary 20 degrees or less from the longitudinal axis 204. In yet another example, an orientation that is substantially parallel to the longitudinal axis 204 may vary 30 degrees or less from the longitudinal axis 204. Other examples are possible as well.

The tool 200 further includes a trigger 220 disposed on the handle 216, and the trigger 220 is configured to be activated by trigger movement along the vertical axis 206 of the tool 200. The user may activate the trigger 220 in order to initiate and/or control operation of the working end 208. In an example, the trigger movement along the vertical axis 206 comprises movement in a proximal direction along the vertical axis. For instance, with reference to FIG. 14a, a user may activate the trigger 220 by pulling the user's trigger finger 242 proximally or down in the vertical direction along the vertical axis 206 of the tool. In another example, trigger movement may include movement in a different direction, such as in a longitudinal direction. For instance, the trigger may be configured to be moved in a distal longitudinal direction. Other example trigger movements are possible as well.

As used herein, the longitudinal axis of the tool is defined as the axis extending longitudinally through the main body and working end of the tool, while the vertical axis is defined as the axis extending vertically through the main body of the tool. Further, the respective distal and proximal ends of these axes 200 (i.e., the longitudinal axis 204 and the vertical axis 206) are defined when the tool is in the orientation in which the tool is shown in FIGS. 13-14a. In particular, the distal and proximal ends of these axes are defined when a user is gripping, in the intended or proper manner, the handle of the tool with the user's right hand, where the user's palm is facing toward the user and the user's fingers curve around the handle in the direction of the user (as shown in FIG. 14a).

In this particular orientation with respect to the user's right hand as shown in FIG. 14a, the distal end of the longitudinal end is the end to the left, whereas the proximal end of the longitudinal end is to the right. Still further, in this particular orientation as shown in FIG. 14a, the proximal end of the vertical axis is the end that is down, whereas the distal end of the vertical axis is the end that is up. Therefore, as used herein and in this particular orientation shown in FIG. 14a, the distal end of the longitudinal end corresponds to the end of the tool on which the working end contacts the pipe to be expanded. In contrast, the proximal end along the longitudinal axis corresponds to the end of the main body 214 opposite the working end 208. Further, the proximal end along the vertical axis corresponds to the end upon which the handle 216 is located (i.e., the end upon which the user interacts with in order to activate the working end 208). In contrast, the distal end along the vertical axis corresponds to the end of the main body along the vertical axis opposite the handle.

Figure 15A:
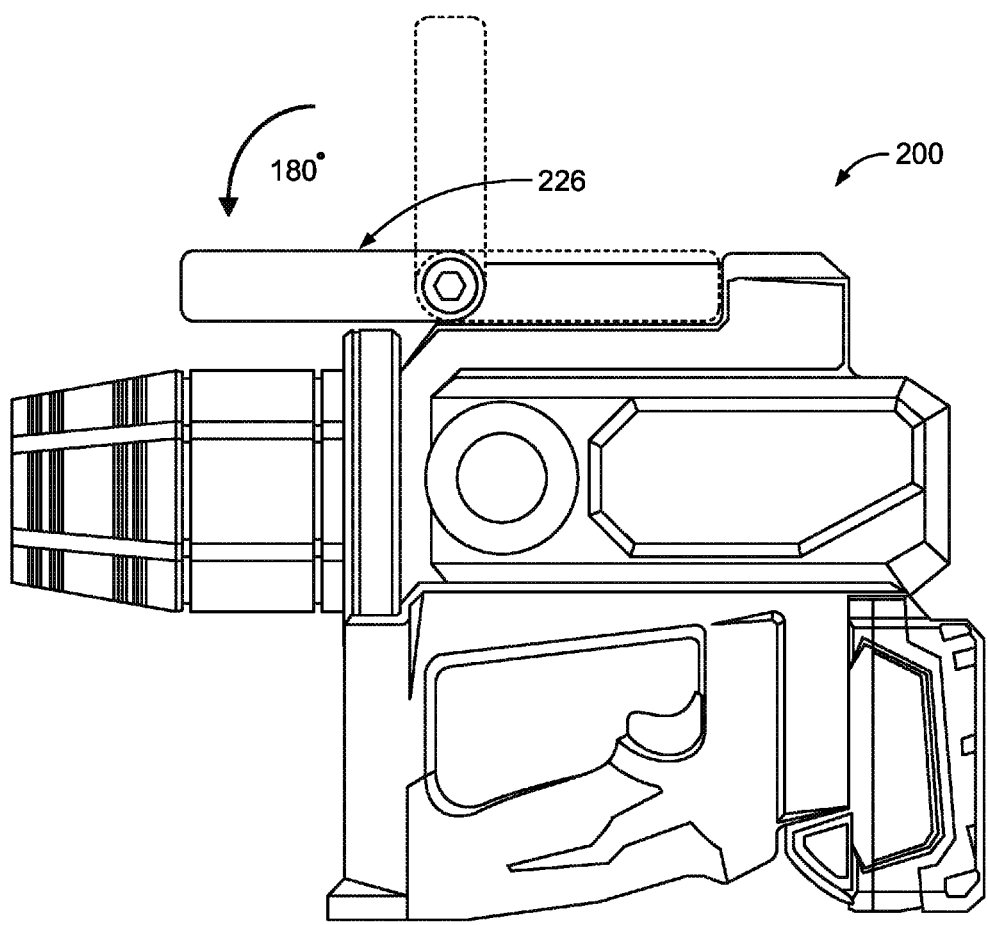
FIG. 15*a* is still yet another perspective view of the hand tool of FIG. 13.
Figure 15B:
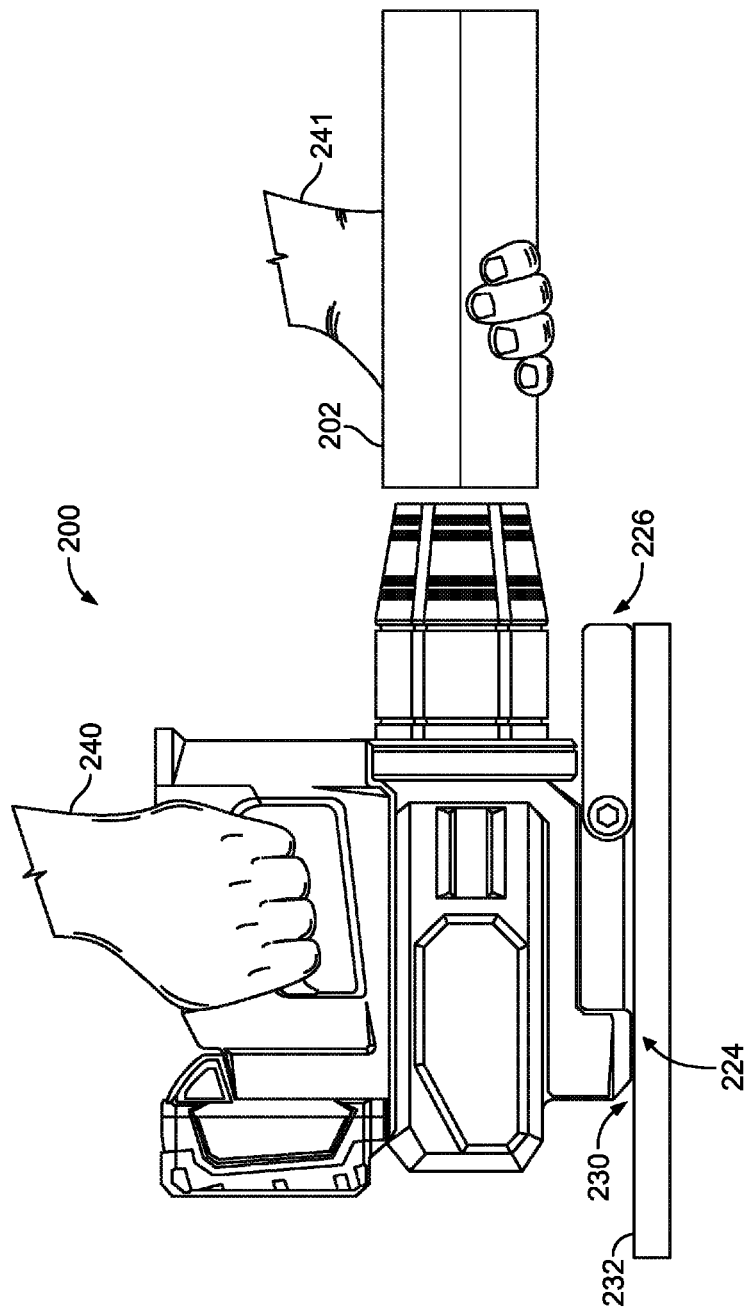
FIG. 15*b* is still yet another perspective view of the hand tool of FIG. 13.

Returning to FIG. 13, the tool 200 further includes a kickstand portion 222 disposed at a distal end 224 along the vertical axis 206 of the tool 200. The kickstand portion 222 includes a kickstand 226 configured to be rotated approximately 180 degrees from a first position that is substantially parallel to the longitudinal axis 204 to a second position that is also substantially parallel to the longitudinal axis 204. The first position that is substantially parallel to the longitudinal axis is depicted in FIG. 13, and the second position that is substantially parallel to the longitudinal axis and rotated approximately 180 degrees from the first position is depicted in FIGS. 15a-b.

The first position of the kickstand 226 may also be referred to herein as the closed kickstand position. This closed position may be useful for various situations, such as packaging of the tool 200 and/or transportation of the tool 200. The second position of the kickstand 226 may also be referred to herein as the fully-open kickstand position. Beneficially, in the fully-open position, the kickstand forms a flat or substantially flat base upon which the tool can rest upon a corresponding flat or substantially flat surface. FIG. 15b depicts the kickstand 226 forming substantially flat base 230 upon which the tool 200 can rest on substantially flat surface 232. In order to form the substantially flat base 230, the kickstand 226 act in conjunction with the distal end 224 along the vertical axis of the main body 214. The substantially flat surface 232 may be any suitable surface upon which a technician may need to rest the tool in order to expand the end of a pipe such as pipe 202. For instance, the substantially flat surface may be a table-top or a floor. Other example surfaces are possible as well.

As can be seen in FIG. 13, when the kickstand 226 is in the closed position, the distal end 224 of the tool 200 forms a substantially flat surface. However, the area of the flat surface when the kickstand 226 is in the closed position is significantly less than the area of the flat surface 230 when the kickstand is in the fully-open position. While a user may rest the tool 200 upon the distal surface 224 when the kickstand 226 is closed, there is a chance that the tool 200 may tilt forward or flip since the weight of the working end 208 may make the tool 200 difficult to balance. Beneficially, when the kickstand 226 is in the fully-open position, the substantially flat base formed by the distal end 224 and the kickstand 226 prevents the tool from tilting or flipping forward when the tool is resting upon the substantially flat surface 232. This kickstand base may thus provide increased stability when the user is operating the tool 200 in this position shown in FIG. 15b.

In example embodiments, the size (e.g., length) of the kickstand 226 may vary. In the example depicted in FIGS. 13-15b, the length of the kickstand is approximately half the length of the working end (see FIG. 15a). However, the kickstand length may be greater (e.g., approximately the length of the working end 208) or less (e.g., $\frac{1}{4}^{th}$ the length of the working end 208). Other examples are possible as well.

In an example embodiment, the kickstand 226 is further configured to lock into a third position that is substantially perpendicular to the longitudinal axis 204 of the tool 200 and substantially parallel to the vertical axis 206. This third position is depicted in FIGS. 14a-b. The kickstand 226 may form a handle 227, and in this third position handle 227 may be useful for holding or carrying the tool. For instance, the user may grip the handle 227 to hold or carry the tool. In another example, a lanyard attachment 244 can be securely placed around the handle. The user may use this lanyard attachment 244 to help the user hold or carry the tool 200. FIG. 14a depicts the handle 227 upon which the lanyard attachment 244 is secured.

In FIGS. 14a-b, the handle 227 formed by kickstand 226 is depicted as a U-shaped handle. This U-shaped handle 227 is attached to distal end 224 at two pivot points 254 and 256. In other examples, the handle formed by kickstand 226 may be a different configuration. For example, kickstand 226 may be a J-shaped kickstand. Such a kickstand could, for example, serve as a rafter hook. In an example embodiment, the J-shaped kickstand could be attached to the distal end 224 at a single pivot point, such as pivot point 254. Other example kickstand configurations are possible as well.

In the example depicted in FIGS. 13-15b, the trigger 222 is located on a longitudinal proximal side 217 of the handle.

However, in other examples, the trigger 222 may be located in other positions at or near the handle 216, such as the longitudinal distal side of the handle 216. Further, the handle 216 is positioned proximal to the working end 208 along the longitudinal axis 204. This proximal placement allows for the working end 208 to be fully inserted into a pipe without the handle 216 causing an obstruction.

In an example embodiment, tool 200 may include one or more additional supports (e.g., handle(s)) that provide the user additional ways to support the tool. Providing additional support may be helpful to the user during operation or transport of the tool 200. For instance, with reference to FIG. 13, tool 200 includes a side-handle attachment portion 250 into which a side handle can be inserted. FIG. 14a depicts side handle 252 inserted into the side handle attachment. Other additional supports are possible as well.

In an example embodiment, tool 200 may be operated by a single hand 240 of user (e.g., as shown in FIG. 14a). By being configured to be operated by a single hand 240 of the user, the user may use his or her free hand 241 in order to position and/or stabilize a pipe that is being expanded (e.g., as shown in FIG. 15b).

Beneficially, a tool in accordance with the present disclosure offers example advantages over existing tools for expanding the end of a pipe or tube. For instance, through the unique disclosed orientation of the handle, the tool 200 offers a user the ability to conveniently operate the tool in a plurality of orientations and in compact spaces. As mentioned above, a technician may use tool 200 for repair of pipes and/or installation of pipes, and this repair or installation work may require the technician to work in tight spaces as well as to use the tool in different locations. As particular examples, a technician may need to use the tool to install or repair a pipe positioned on the floor, on a sidewall, or overhead. Further, these pipes may be arranged in a plurality of different orientations. For instance, the end to be expanded may be facing vertically downwards, vertically upwards, longitudinally to the left, longitudinally to the right, or at many other angles.

It may be difficult or not possible to use existing expanding tools in such a plurality of orientations. However, since tool 200 is configured to allow the user to operate the tool 200 in a number of different and useful orientations, a user may use the tool in a variety of situations and places in which operating existing tools would be difficult or not possible. For example, the handle orientation in accordance with the disclosure beneficially allows the user to more easily use—compared to existing expanding tools—the tool in an overhead position. Additionally, the orientation of the handle may allow a user to more easily support an expanding tool in the overhead position. A tool such as a six ton tool may be heavy and thus difficult to not only position the tool but also hold and support the tool in place during operation. Tool 200 beneficially allows a user to utilize the tool overhead without bending or substantially bending the user's wrist. This may allow the user to more comfortably support the tool for overhead installation or repair work.

As another example, the orientation of the handle 216 and the arrangement of the kickstand 226 beneficially allows for the tool 200 be used on a table-top or a floor. As mentioned above, the weight of the tool may be substantial, and thus it may be beneficial for a technician to reduce the effect of this weight by using the tool in this table-top or floor positions. Therefore, the disclosed orientation of the handle beneficially allows the user to conveniently and easily use the tool in both an overhead position and a table-top or floor position.

As yet another example, with reference to FIG. 13, the user could rotate the tool 200 90 degrees counter-clockwise. In this orientation, the tool 200 may be used to expand an end of a pipe that is facing vertically upwards. As still yet another example, with reference to FIG. 13, the user could rotate the tool 200 90 degrees clockwise. In this orientation, the tool 200 may be used to expand an end of a pipe that is facing vertically downwards. Other orientations (e.g., angles) at which the disclosed tool can conveniently and successfully operate are possible as well.

Another benefit of the disclosed tool is that, by having the handle arranged in the longitudinal direction, the tool beneficially has a decreased vertical footprint that may be smaller than existing expanding tools. For instance, tool 200 has a smaller vertical length than expanding tools 3 depicted in FIGS. 10 and 11. This decreased vertical footprint beneficially allows the tool 200 to be operable in compact areas. As mentioned above, a technician often has to work in compact spaces when installing and/or repairing pipe. Therefore, the tool in accordance with this disclosure may allow the user to operate the tool in spaces that are more tight or compact than spaces where the technician could operate other expanding tools.

3. CONCLUSION

Exemplary embodiments have been described above. Those skilled in the art will understand, however, that changes and modifications may be made to these embodiments without departing from the true scope and spirit of the invention. The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

I claim:

1. A tool operable to expand an end of a pipe, wherein the tool has a longitudinal axis and a vertical axis, the tool comprising:
a working end disposed at a distal end along the longitudinal axis, the working end comprising a plurality of jaws movable between a closed position and an expanded position and rotatable about the longitudinal axis of the tool;
a main body connected to the working end, the main body comprising a handle disposed at a proximal end along the vertical axis of the tool, wherein the handle is disposed, and configured to be gripped, in an orientation that is substantially parallel to the longitudinal axis of the tool, wherein the orientation that is substantially parallel to the longitudinal axis of the tool has an axis that varies less than 30 degrees from the longitudinal axis of the tool; and
a trigger disposed on the handle, wherein the trigger is configured to be activated by trigger movement along the vertical axis of the tool.

2. The tool of claim 1, wherein the main body further comprises a kickstand portion disposed at a distal end along the vertical axis of the tool, wherein the kickstand portion comprises a kickstand configured to be rotated approximately 180 degrees from (i) a first position that is substantially parallel to the longitudinal axis to (ii) a second position that is substantially parallel to the longitudinal axis.

3. The tool of claim 2, wherein in the second position the kickstand forms a substantially flat base upon which the tool can rest upon a substantially flat surface.

4. The tool of claim 3, wherein the substantially flat base prevents the tool from tilting forward when the tool is resting upon the substantially flat surface.

5. The tool of claim 2, wherein the kickstand is further configured to lock into a third position that is substantially perpendicular to the longitudinal axis of the tool and substantially parallel to the vertical axis.

6. The tool of claim 5, wherein the kickstand forms a handle around which a lanyard attachment can be secured.

7. The tool of claim 1, wherein the trigger is positioned on a proximal side of handle.

8. The tool of claim 1, wherein the handle is positioned proximal to the working end.

9. The tool of claim 1, wherein the tool is configured to be operated by a single hand of user.

10. The tool of claim 1, wherein the trigger movement along the vertical axis comprises movement in a proximal direction along the vertical axis.

11. The tool of claim 1, wherein the pipe comprises a cross-linked polyethylene (PEX) tube.

12. A tool operable to expand an end of a pipe, wherein the tool has a longitudinal axis and a vertical axis, the tool comprising:
  a working end disposed at a distal end along the longitudinal axis, the working end comprising a plurality of jaws movable between a closed position and an expanded position and rotatable about the longitudinal axis of the tool;
  a main body connected to the working end, the main body comprising (i) a handle disposed at a proximal end along the vertical axis of the tool and (ii) a kickstand portion disposed at a distal end along the vertical axis of the tool;
  a trigger disposed on the handle;
  wherein the handle is disposed, and configured to be gripped, in an orientation that is substantially parallel to the longitudinal axis of the tool;
  wherein the orientation that is substantially parallel to the longitudinal axis of the tool has an axis that varies less than 30 degrees from the longitudinal axis of the tool;
  wherein the trigger is configured to be activated by trigger movement along the vertical axis of the tool; and
  wherein the kickstand portion comprises a kickstand configured to be rotated 180 degrees from (i) a first position that is substantially parallel to the longitudinal axis to (ii) a second position that is substantially parallel to the longitudinal axis.

13. The tool of claim 12, wherein in the second position the kickstand forms a substantially flat base upon which the tool can rest upon a substantially flat surface.

14. The tool of claim 13, wherein the substantially flat base prevents the tool from tilting forward when the tool is resting upon the substantially flat surface.

15. The tool of claim 13, wherein the kickstand is further configured to lock into a third position that is substantially perpendicular to the longitudinal axis of the tool and substantially parallel to the vertical axis.

16. The tool of claim 15, wherein the kickstand forms a handle around which a lanyard attachment can be secured.

17. The tool of claim 12, wherein the trigger is positioned on a proximal side of handle.

18. The tool of claim 12, wherein the handle is positioned proximal to the working end.

19. The tool of claim 12, wherein the tool is configured to be operated by a single hand of user.

20. The tool of claim 12, wherein the trigger movement along the vertical axis comprises movement in a proximal direction along the vertical axis.

21. A tool operable to expand an end of a pipe or tube, wherein the tool has a longitudinal axis and a vertical axis, the tool comprising:
  a working end disposed at a distal end along the longitudinal axis, wherein the working end is configured to expand the end of the pipe or tube;
  a main body connected to the working end, the main body comprising a handle disposed at a proximal end along the vertical axis of the tool, wherein the handle is disposed, and configured to be gripped, in an orientation that is substantially parallel to the longitudinal axis of the tool, wherein the orientation that is substantially parallel to the longitudinal axis of the tool has an axis that varies less than 30 degrees from the longitudinal axis of the tool; and
  a trigger disposed on the handle, wherein the trigger is configured to be activated by trigger movement along the vertical axis of the tool.

22. The tool of claim 21, wherein the tool is a hydraulic expanding tool.

23. The tool of claim 21, wherein the orientation that is substantially parallel to the longitudinal axis of the tool has an axis that varies less than 20 degrees from the longitudinal axis of the tool.

24. The tool of claim 21, wherein activation of the trigger initiates operation of the working end.

* * * * *